United States Patent [19]
Morgan et al.

[11] Patent Number: 5,562,759
[45] Date of Patent: Oct. 8, 1996

[54] GAS COLLECTION SYSTEM FOR ANAEROBIC PONDS

[76] Inventors: William D. Morgan; Michael A. Morgan, both of 6009 Chapel Dr., Minneapolis, Minn. 55439

[21] Appl. No.: 512,094

[22] Filed: Aug. 7, 1995

[51] Int. Cl.$^6$ .................................... B01D 19/00
[52] U.S. Cl. ................ 96/155; 52/5; 52/23; 96/193; 96/220; 210/603; 210/DIG. 9
[58] Field of Search .............. 95/241, 294; 52/266, 52/5, 23; 96/155, 193, 220; 210/120, 188, 603, 750, DIG. 9; 261/119.1, 125

[56] References Cited

U.S. PATENT DOCUMENTS

| | | | |
|---|---|---|---|
| 3,933,628 | 1/1976 | Varani | 210/603 |
| 4,034,030 | 7/1977 | Bracey | 261/125 |
| 4,213,923 | 7/1980 | Bryson | 261/119.1 |
| 4,253,956 | 3/1981 | Pette | 96/220 |
| 5,338,452 | 8/1994 | Pidaparti | 210/603 |
| 5,400,549 | 3/1995 | Morgan | 52/23 |

FOREIGN PATENT DOCUMENTS

| | | | |
|---|---|---|---|
| 3904326 | 8/1990 | Germany | 95/241 |
| 662748 | 10/1987 | Switzerland | 96/155 |
| 1360767 | 12/1987 | U.S.S.R. | 96/155 |

*Primary Examiner*—C. Scott Bushey
*Attorney, Agent, or Firm*—Thomas B. Tate

[57] ABSTRACT

A system for collecting gas generated in an anaerobic pond which is covered by an insulated cover. The system includes a series of gas collection pipes which are laid on top of and are secured to the panel units of the insulated cover and a solid cover which fits over the top of the collection pipes.

1 Claim, 2 Drawing Sheets

GAS COLLECTION SYSTEM FOR ANAEROBIC PONDS

SUMMARY AND BACKGROUND OF THE INVENTION

Anaerobic settling ponds generate various gases as part of the anaerobic processes, methane being one of the principal ones. It is desirable to collect the gases in order to prevent environmental damage and to reduce odor, and also in order to burn the methane as a subsidiary fuel. The typical method used today is to place a solid cover over the pond to trap the gases.

The present invention is a system which is used in combination with an insulated removable pond cover of the type described in my U.S. Pat. No. 5,400,549. The system includes a plurality of gas collection pipes which are positioned in the channels of the insulated pond cover and a solid gas collection cover which fits over the top of the pipes. The gases are formed toward the perimeters of the pond cover, where they are collected.

The advantages of this system are that it can be put into position easily and quickly, and it can be removed without being destroyed.

DESCRIPTION OF THE PREFERRED EMBODIMENT OF THE INVENTION

Figure 1:
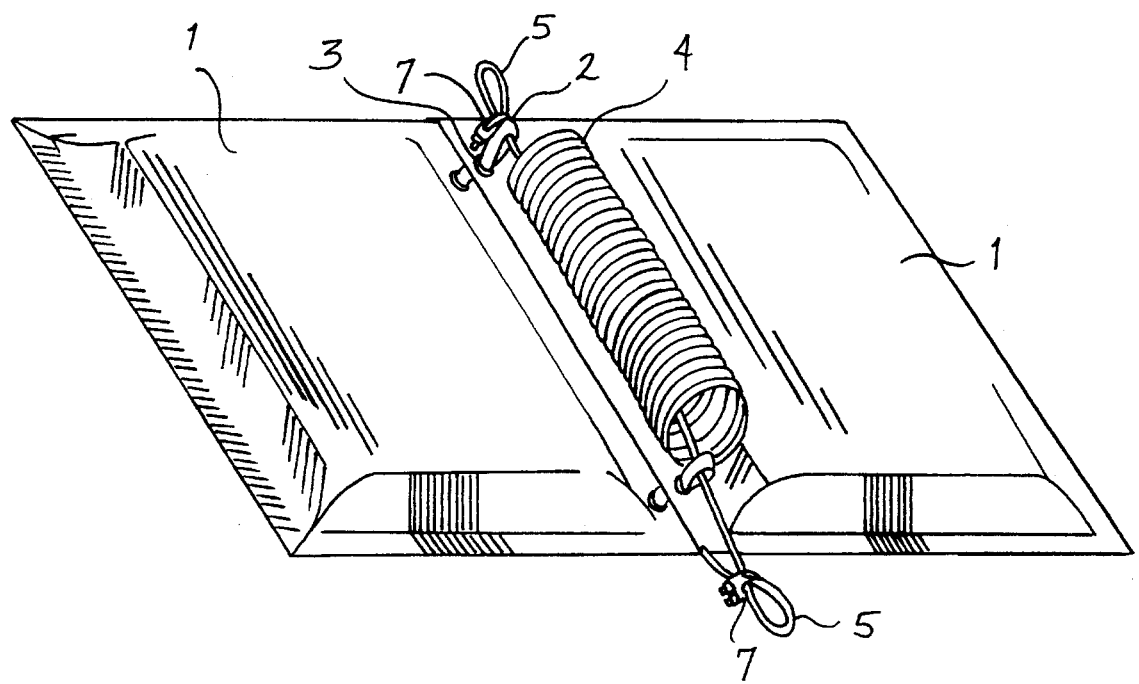
FIG. 1 is a top perspective view of two of the panels, with the cover removed to reveal the pipe and cable structure.
Figure 2:
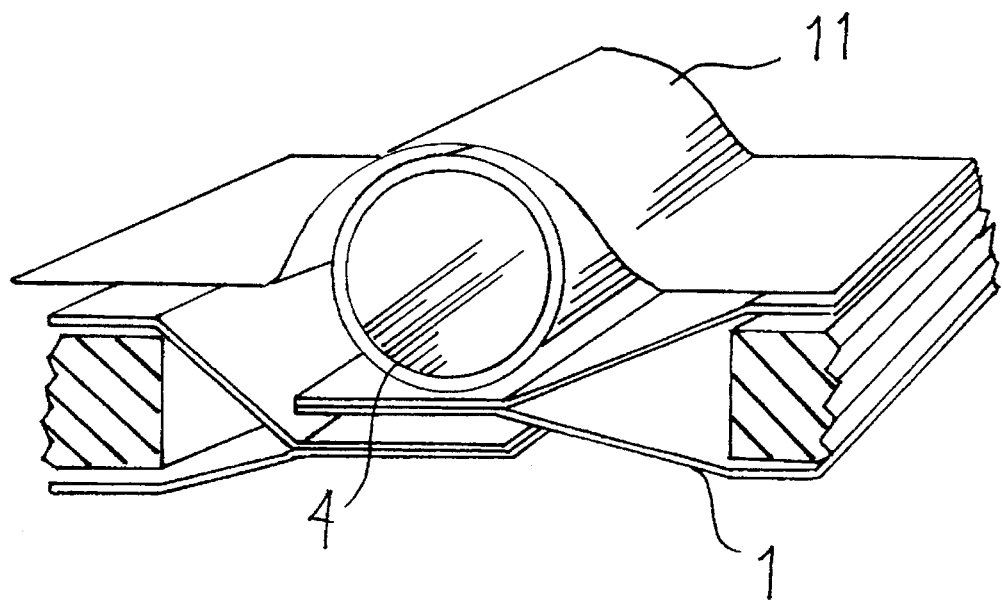
FIG. 2 is a side perspective view of parts of two panels with the cover in position.

An insulated removable pond cover is comprised of a plurality of insulation-filled casings or panel units 1, each of which is, on the average, about seven and one-half feet wide and forty feet long, which are linked together in vertical spaced relationship by means of high density polyethylene (HDPE) loops 2 which are disposed through eyelets 3 near the sealed ends of casings 1 and which can be secured by a button underneath the eyelet 3.

Gases generated within the pond can migrate through the seams between the panel units 1. In order to collect the gases, it is necessary to force the gases to migrate to the perimeters of the pond cover.

The system to accomplish this is as follows: a plurality of gas collection pipes 4 are laid on top of the insulated cover. The collection pipes 4 are laid along the natural channels formed by the junctions of adjacent panel units 1 and therefore the rows of pipes 4 are about seven and one-half feet apart. Each row of pipes 4 comprises a series of pipes 4 which are laid end-to-end along the forty foot length of each panel unit 1, but not continuously, instead leaving a gap of about two inches between each pipe 4. (The eyelets 3 are spaced about thirty-six inches apart and each pipe 4 is about thirty-four inches long, thus the two inch gap). The pipes 4 are preferably made of HDPE, are preferably grooved to add rigidity to their walls, and can be either four inches or six inches in diameter.

Each pipe 4 is held in position by a cable 5 which is disposed through the opening of the pipe 4 and through loops 2 beyond either end of pipe 4. The cable 5 is secured at either end by a cable clamp 7. A solid gas collection cover 11 is laid over the top of the gas collection pipes 4 and is completely sealed. The preferred means to hold the cover 11 in position is a plurality of pipes (not shown) which are weighted by being filled with sand and which are placed on top of, and strapped to, the cover 11. Normally gas collection pipes 4 and weighted pipes will be positioned so that they alternate every other junction between panels 1, but it is possible to have all pipes be gas collection pipes 4 if other means of anchoring the cover 11 are used.

The ends of the cover 11 are secured by any of several conventional methods, which may include battening to a ring wall or burying in an anchor trench, to provide a gas-tight seal. The gases flow from one pipe 4 to another underneath the cover 11 until the perimeter is reached. At that point, the gas is conventionally removed, passing through a pipe which goes through the concrete wall to a pump which pumps not the gas.

We claim:

1. A system for collecting gas generated in an anaerobic pond, said system to be used in combination with an insulated removable pond cover which comprises a plurality of panel units linked together, said system comprising:

a plurality of gas collection pipes laid intermittently along the connections between said panel units, said pipes resting on top of said insulated panels and being held in position thereon by loop and cable means;

a solid cover laid over the top of said collection pipes to trap said generated gases and force said gases toward the perimeters of said insulated pond cover, and means to hold said solid cover in position.

* * * * *